(12) United States Patent
Fujimoto et al.

(10) Patent No.: US 9,446,492 B2
(45) Date of Patent: Sep. 20, 2016

(54) PROCESSING APPARATUS AND PROCESSING METHOD

(75) Inventors: Satoshi Fujimoto, Iwata (JP); Satoshi Sugitatsu, Iwata (JP); Masashi Kitai, Iwata (JP)

(73) Assignee: NTN CORPORATION, Osaka (JP)

(\*) Notice: Subject to any disclaimer, the term of this patent is extended or adjusted under 35 U.S.C. 154(b) by 149 days.

(21) Appl. No.: 13/822,370

(22) PCT Filed: Sep. 8, 2011

(86) PCT No.: PCT/JP2011/070458
§ 371 (c)(1),
(2), (4) Date: Mar. 12, 2013

(87) PCT Pub. No.: WO2012/036062
PCT Pub. Date: Mar. 22, 2012

(65) Prior Publication Data
US 2013/0171914 A1 Jul. 4, 2013

(30) Foreign Application Priority Data
Sep. 17, 2010 (JP) ................................. 2010-208789

(51) Int. Cl.
*B24B 5/00* (2006.01)
*B24B 5/18* (2006.01)
*B24B 5/26* (2006.01)
(Continued)

(52) U.S. Cl.
CPC ................ *B24B 5/04* (2013.01); *B24B 5/245* (2013.01); *B24B 19/06* (2013.01); *F16C 33/366* (2013.01)

(58) Field of Classification Search
CPC ............. B24B 5/00; B24B 5/18; B24B 5/26; B24B 5/245; B24B 5/38; B24B 33/04
USPC ........................... 451/49, 188, 189, 338, 407
See application file for complete search history.

(56) References Cited

U.S. PATENT DOCUMENTS 1,767,775 A * 6/1930 Slick, Jr. ........................ 451/49
1,886,579 A * 11/1932 Pew ................................ 451/49
(Continued)

FOREIGN PATENT DOCUMENTS

| CN | 101367179 | 2/2009 |
| CN | 101433984 | 5/2009 |

(Continued)

OTHER PUBLICATIONS

Chinese Office Action dated Aug. 12, 2014 in corresponding Chinese Patent Application No. 201180044464.7.
(Continued)

*Primary Examiner* — Robert Rose

(57) ABSTRACT

A processing apparatus includes two feed drums, each having an outer periphery formed with a spirally extending threaded guide surface and adapted to be driven to rotate, disposed so as to extend parallel to each other, and the feed drums are used to pass a roller through between the feed drums by the rotation thereof while the roller is caused to rollingly contact the mutually opposed threaded guide surface, and also includes a grinding stone for processing a crowned portion of the roller passing thorough between the feed drums. The threaded guide surface of the feed drums is divided into two axially juxtaposed divided threaded surface areas so that an outer peripheral surface of the roller can be supported at two anteroposterior locations.

7 Claims, 5 Drawing Sheets

(51) Int. Cl.
  *B24B 5/04* (2006.01)
  *F16C 33/36* (2006.01)
  *B24B 19/06* (2006.01)
  *B24B 5/24* (2006.01)

(56) References Cited

U.S. PATENT DOCUMENTS

| | | | |
|---|---|---|---|
| 2,002,489 A * | 5/1935 | Booth et al. | 451/189 |
| 2,043,972 A * | 6/1936 | Merryweather | 451/189 |
| 2,132,280 A * | 10/1938 | Zimmerman | 451/49 |
| 2,476,683 A * | 7/1949 | Pieri | 451/207 |
| 4,573,289 A * | 3/1986 | Wieck | 451/173 |
| 5,674,112 A * | 10/1997 | Steinwender | 451/49 |
| 2004/0264825 A1 | 12/2004 | Kamamura et al. | |

FOREIGN PATENT DOCUMENTS

| | | |
|---|---|---|
| CN | 101767297 | 7/2010 |
| DE | 2436474 | 3/1975 |
| DE | 19543941 | 10/1996 |
| JP | 56-121562 | 9/1981 |
| JP | 59-30653 | 2/1984 |
| JP | 60-21170 | 6/1985 |
| JP | 7-100743 | 4/1995 |
| JP | 7-290347 | 11/1995 |
| JP | 2003-340692 | 12/2003 |
| JP | 2004-322307 | 11/2004 |
| JP | 2008-76146 | 4/2008 |
| JP | 2010-30003 | 2/2010 |

OTHER PUBLICATIONS

Japanese Office Action issued May 13, 2014 in corresponding Japanese Patent Application No. 2010-208789.
International Preliminary Report on Patentability mailed Apr. 25, 2013 in corresponding International Application No. PCT/JP2011/070458.
International Search Report for corresponding PCT application PCT/JP2011/070458 mailed Oct. 11, 2011.
U.S. Office Action dated Jun. 17, 2016 in copending U.S. Appl. No. 14/933,242.

* cited by examiner

PROCESSING APPARATUS AND PROCESSING METHOD

CROSS REFERENCE TO THE RELATED APPLICATION

This application is a U.S. National Stage application of PCT/JP2011/070458 filed Sep. 8, 2011 and claims the foreign priority benefit of Japanese Application No. 2010-208789 filed Sep. 17, 2010, in the Japanese Intellectual Property Office, the contents of both of which are herein incorporated by reference as a part of this application.

BACKGROUND OF THE INVENTION

1. Field of the Invention

The present invention relates to a processing apparatus and a processing method, which are applied in crowning a cylindrical roller and a tapered roller and, also in superfinishing the crowned article of manufacture.

2. Description of Related Art

FIG. 11A illustrates a top plan view of the conventional feed drum assembly and FIG. 11B illustrates a front elevational view of an important portion of the feed drum assembly. In the case of, for example, a tapered roller which is a workpiece W to be processed, only an outer diametric straight portion 50 can be used for a process of superfinishing by way of a through feed utilizing feed drums 51 and 52. In this respect, see the patent document 1 listed below. At this time the feed drums 51 and 52 are such that in order to linearly support the workpiece W, the angle of inclination between a grinding stone 53 and the workpiece W is fixed over the entire feed drum region. Accordingly, it is impossible to perform the superfinishing of a crowned portion 54 of the workpiece W with the use of the feed drums 51 and 52.

PRIOR ART LITERATURE

[Patent Document 1] JP Laid-open Patent Publication No. H07-100743
[Patent Document 2] JP Laid-open Patent Publication No. H07-290347

A crowned portion of the tapered roller requires a substantial length of processing time and cannot be adapted to a mass production because the superfinishing is performed on the workpiece on a piecemeal basis. Even when the superfinishing of the crowned portion of the tapered roller with the use of a grinding stone having its outer diametric surface shaped to a crowning shape by means of a plunge cutting, the length of processing time required to complete it is indeed substantial and cannot be adapted to a mass production. A method of crowning the tapered roller with the use of a centerless grinding machine while an outer diametric surface of the grinding stone and that of a regulating wheel are given a rounded shape (such as disclosed in the patent document 2 referred to above) cannot be adapted to the shaping of an article to have a radius of curvature of 1,000 mm or smaller and also to the shaping of an article to have a logarithmically curved shape. Where the crowned portion is formed in the tapered roller with the use of the conventional through feed processing method, such limitations have been encountered with that only a single rounded shape and a composite of single rounded shapes.

SUMMARY OF THE INVENTION

In view of the foregoing, a primary object of the present invention is to provide a highly versatile processing apparatus and a equally highly versatile processing method, which can be applied in crowning rollers and superfinishing crowned articles, in which not only is the length of processing time reduced, but they can be adapted to the mass production, and which can be used in shaping articles to have a crowned portion of a small radius of curvature and to have a logarithmically curved shape.

The present invention therefore provides, in accordance with a first aspect thereof, a processing apparatus for processing a crowned portion of a roller, which apparatus includes first and second feed drums each having an outer periphery formed with respective spirally extending threaded guide surfaces, the first and second feed drums extending parallel to each other and being driven to rotate about respective central axes (longitudinal axes) to transport the roller, while the roller is held in rolling contact with the threaded guide surfaces opposed to each other, from a first location towards a second location through between the first and second feed drums; and a grinding stone for processing the crowned portion of the roller passing through between the first and second feed drums. The threaded guide surface of one of the first and second feed drums referred to above is divided into two axially juxtaposed divided threaded surface areas so that an outer peripheral surface of the roller may be supported at two anteroposterior locations of such roller.

According to the first aspect of the present invention, the two feed drums are disposed so as to extend parallel to each other and, while the roller is rotated between the feed drums by the rotation of those feed drums, such roller is transported from the upstream side towards the downstream side in the direction of transport. With the grinding stone pressed against the roller then moving between the feed drums, the crowned portion is processed. At this time, since the threaded guide surface of one of the first and second feed drums is so divided into the two axially juxtaposed divided threaded surface areas that the outer peripheral surface of the roller can be supported at the two anteroposterior locations, the difference in radius of curvature can be given to roller contact points on those two divided threaded surface areas and, hence, the roller can be inclined at an arbitrary angle of inclination relative to the grinding stone. Also, since the threaded guide surface is divided into the two axially juxtaposed divided threaded surface areas as hereinabove described, two anteroposterior portions of the outer peripheral surface of the roller can be assuredly supported. Accordingly, the crowned portion of the plurality of the rollers can be successively processed by means of the through feed processing with the use of the feed drums and, therefore, as compared with the processing of the rollers on a piecemeal basis or the processing by means of a plunge cutting, the processing can be accomplished in a reduced length of time and the processing apparatus of the present invention can be advantageously used in a mass production. For this reason, the cost of manufacture of the rollers can be reduced.

In a preferred embodiment of the present invention, in a section along the central axis of the feed drum, each of the divided threaded surface areas may be of an arcuate shape protruding radially outwardly. In this case, not only can the outer peripheral surface of the roller be assuredly set to a desired angle of inclination relative to the processing surface of the grinding stone, but also the roller can be caused to smoothly rollingly contact the divided threaded surface areas each being of an arcuate shape. The divided threaded surface areas may be of a type in which the difference between respective radii of curvature at roller contact points of the two axially juxtaposed divided threaded surface areas is varied in dependence on a roller passing position of the feed drum. If the difference between the respective radii of curvature at the roller contact points of the two axially juxtaposed divided threaded surface areas is varied, it is possible to easily and assuredly change the angle of inclination of the outer peripheral surface of the roller relative to the processing surface of the grinding stone.

In another preferred embodiment of the present invention, a roller contact point of one of the two axially juxtaposed divided threaded surface areas may be caused to protrude radially outwardly beyond a roller contact point of the other of the two axially juxtaposed divided threaded surface areas such that a surface of the roller guided in contact with those roller contact points is inclined relative to a processing surface of the grinding stone. In this case, the crowned portion of the roller can be processed with the outer peripheral surface of the roller inclined relative to the processing surface of the grinding stone. In this case, the angle of inclination of a linear line, which connects between the roller contact points of the two divided threaded surface areas, relative to the central axis of the feed drum may change continuously from an upstream side towards a downstream side with respect to the direction of transport. If as hereinabove described the two divided threaded surface areas are formed, it is possible to change continuously the angle of inclination of the outer peripheral surface of the roller relative to the processing surface of the grinding stone in a direction conforming to the direction of transport. Therefore, for example, it becomes possible to achieve a crowning processing of the roller to have a logarithmically curved shape and, also, a crowning processing of a kind having a minute radius of curvature.

In a further preferred embodiment of the present invention, the threaded guide surface of the feed drum may be divided by spirally extending collared convolutions from the neighboring peripheral portions. When in a condition with an end face of the roller held in contact with the collared convolution, the feed drums are rotated, the roller can be transported from an upstream side towards a downstream side in the direction of transport. The roller referred to above may be either a cylindrical roller or a tapered roller.

The present invention in accordance with a second aspect thereof also provides a method of processing a crowned portion of a roller, which method includes a step of disposing first and second feed drums so as to extend parallel to each other, each of the first and second feed drums having an outer periphery formed with respective spirally extending threaded guide surfaces, the first and second feed drums being driven to rotate about respective central axes to transport the roller, while the roller is held in rolling contact with the threaded guide surfaces opposed to each other, from a first location towards a second location through between the first and second feed drums, and processing the crowned portion of the roller passing through between the first and second feed drums, by a grinding stone. In the practice of this processing method, the threaded guide surface of one of the first and second feed drums is divided into two axially juxtaposed divided threaded surface areas so that an outer peripheral surface of the roller may be supported at two anteroposterior locations of such roller.

According to the second aspect of the present invention, the two feed drums are disposed so as to extend parallel to each other and, while the roller is rotated between the feed drums by the rotation of those feed drums, such roller is transported from the upstream side towards the downstream side in the direction of transport. With the grinding stone pressed against the roller then moving between the feed drums, the crowned portion is processed. At this time, since the threaded guide surface of one of the first and second feed drums is so divided into the two axially juxtaposed divided threaded surface areas that the outer peripheral surface of the roller can be supported at the two anteroposterior locations, two anteroposterior portions of the outer peripheral surface of the roller can be assuredly supported and, hence, the roller can be inclined at an arbitrary angle of inclination relative to the grinding stone. Accordingly, the crowned portion of the plurality of the rollers can be successively processed by means of the through feed processing with the use of the feed drums and, therefore, as compared with the processing of the rollers on a piecemeal basis or the processing by means of a plunge cutting, the processing can be accomplished in a reduced length of time and the processing apparatus of the present invention can be advantageously used in a mass production. For this reason, the cost of manufacture of the rollers can be reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described in detail with reference to the accompanying drawings, particularly FIGS. 1 to 10. In describing the preferred embodiment of the present invention, the processing apparatus employed in the practice of such embodiment will be described as used to perform a superfinishing of a crowned portion in a tapered roller, noting that in the description that follows, a processing method to superfinish the roller is also described.

Figure 1:
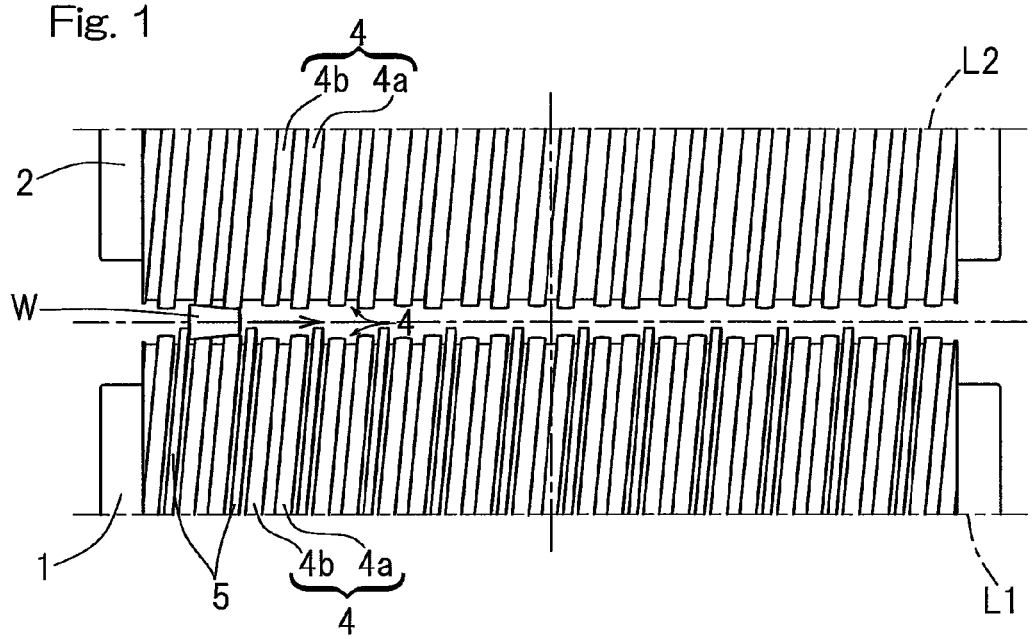
FIG. 1 is a top plan view of a processing apparatus designed in accordance with a preferred embodiment of the present invention.
Figure 2:
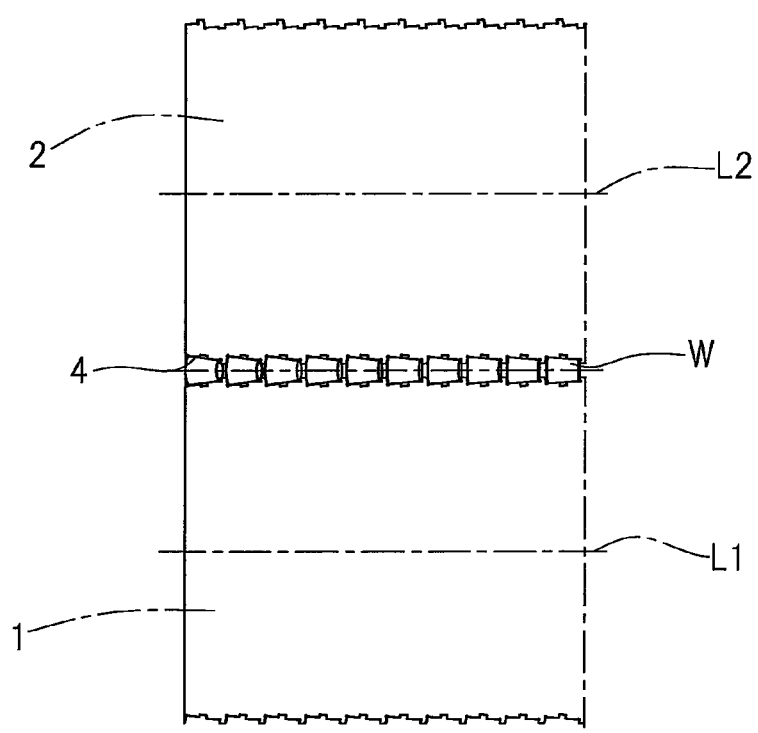
FIG. 2 is a top plan view of the processing apparatus.
Figure 4:
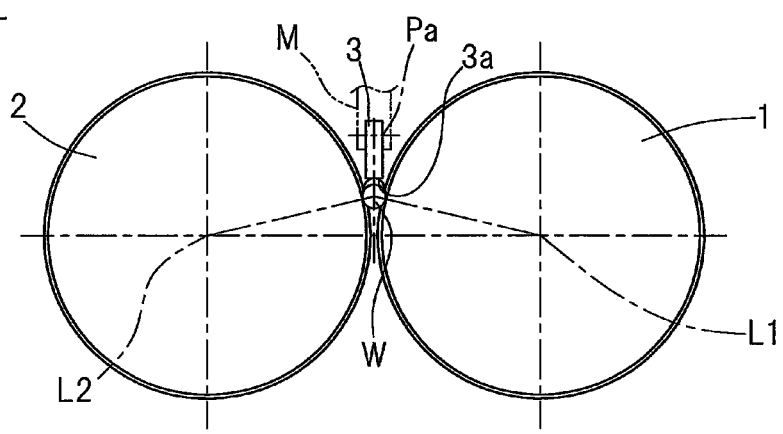
FIG. 4 is a left side view of the processing apparatus.
Figure 5:
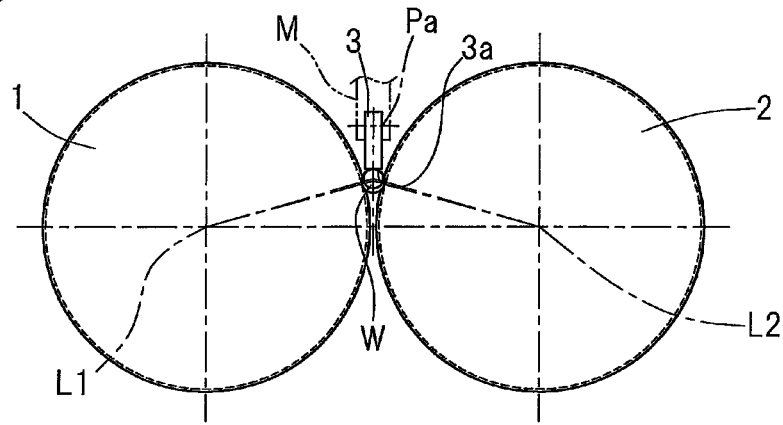
FIG. 5 is a right side view of the processing apparatus.

Referring first to FIGS. 1 and 2, the processing apparatus mainly includes two feed drums 1 and 2 and a grinding stone 3 best shown in FIG. 4. Each of the two feed drums 1 and 2 has its outer periphery formed with a spirally threaded guide surface 4 and is adapted to be driven about a respective central axis L1 or L2. Those two feed drums 1 and 2 are juxtaposed relative to each other with the central axes L1 and L2 extending parallel to each other and are spaced a predetermined distance from each other. The processing apparatus referred to above is so designed that a roller W to be processed is passed in between the feed drums 1 and 2 while the roller is held in part in rolling contact with the spirally threaded guide surface 4 of one of the feed drums 1 and 2 and in part in rolling contact with the spirally threaded guide surface 4 of the other of the feed drums 1 and 2.

Figure 3:
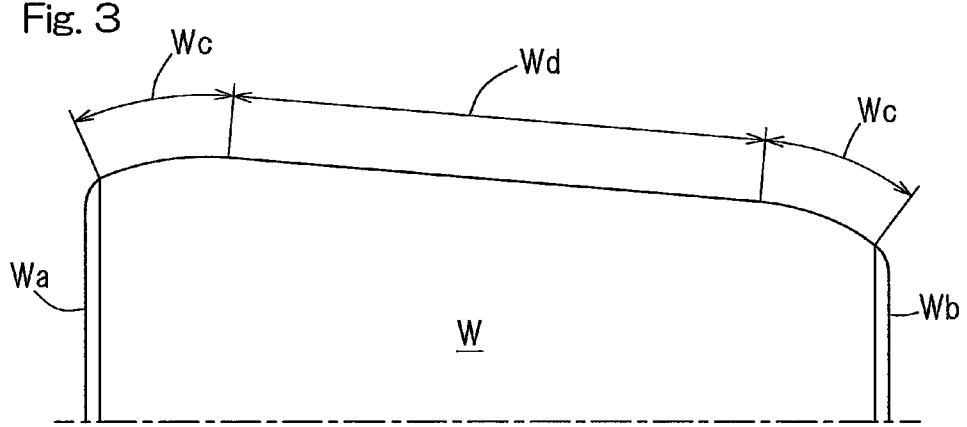
FIG. 3 is a fragmentary enlarged view of a roller, showing one example in which with the use of the processing apparatus the roller has been superfinished to have a logarithmically crowned portion.

The grinding stone 3 referred to above is used to process a crowned portion Wc in the roller W as shown in FIG. 3. The roller W has an outer peripheral surface made up of a straight portion Wd of a linear shape and crowned portions Wc and Wc formed at axially spaced opposite ends of the straight portion Wd. Each of the crowned portions Wc best shown in FIG. 3 is of a shape expressed by a logarithmic function and is so formed into the crowned portion Wc of a kind capable of uniformizing the distribution of contact pressures in an axial direction (longitudinal direction). As will be described in detail later, when the roller W rotated about its own longitudinal axis is transported in a direction conforming to the direction of transportation thereof while the outer peripheral surface of the roller W is inclined in contact with a processing surface of the grinding stone 3 best shown in FIG. 10, the crowning portions Wc and Wc are processed in the outer peripheral surface of the roller W.

Figure 9:
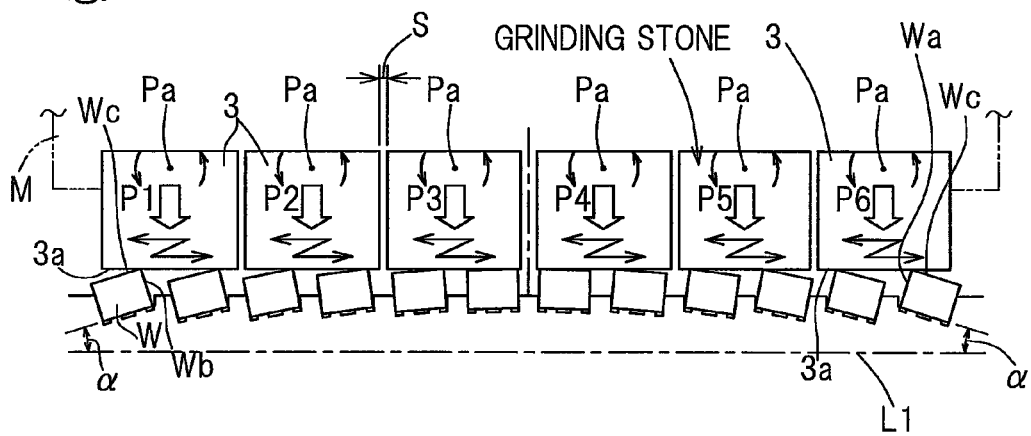
FIG. 9 is a schematic diagram showing the relation between a grinding stone and a roller when the superfinishing of a logarithmically crowned portion for the roller is performed.

As shown in FIGS. 4 and 9, as the grinding stone, a so-called stick rubstone formed in a plate-like shape is employed in the practice of the preferred embodiment of the present invention now under discussion. As best shown in FIG. 4, the plate-like grinding stone 3 is employed in a plural number and those grinding stones 3 are in series with each other in a direction parallel to the respective central axes L1 and L2 of the feed drums 1 and 2 as shown in FIG. 9 with lower edge portions 3a, which are processing surfaces of the grinding stones 3, being inserted in between those feed drums 1 and 2.

Figure 10:
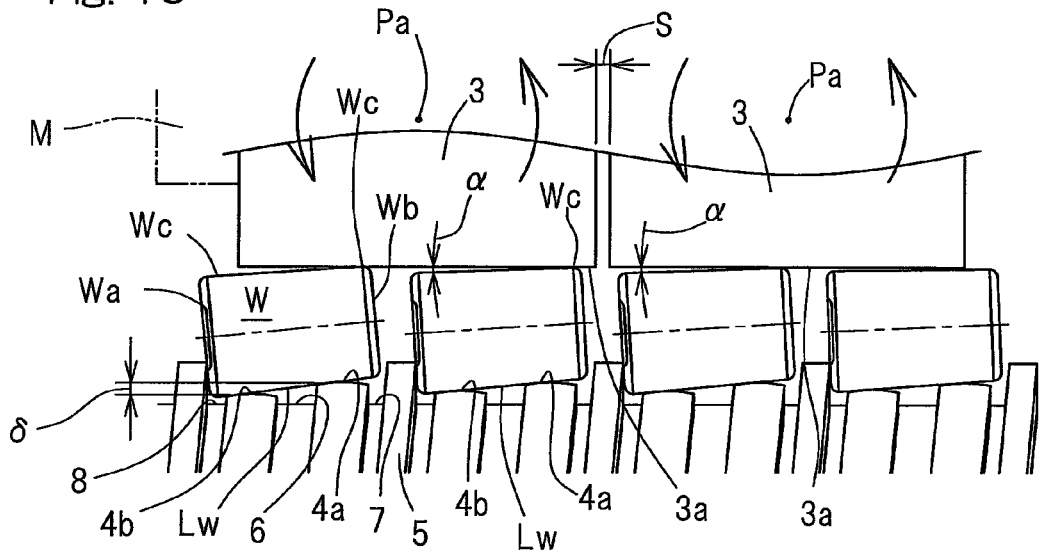
FIG. 10 is a fragmentary enlarged view of a portion of FIG. 9.

Referring to FIGS. 9 and 10, the plurality of those grinding stones 3 are supported by a support member M so that each of the grinding stones 3 can be rocked in a direction parallel to any one of the central axes L1 and L2, best shown in FIG. 4, relative to the support member M. Each of those grinding stones 3 is so structured as to be capable of undergoing a rocking motion (an oscillating motion) in order to form the crowned portions Wc represented by the previously described logarithmic function. Also, a gap S is provided between the neighboring grinding stones 3 and 3 so as to avoid an undesirable interference between those neighboring grinding stones 3 and 3 at the time the corresponding grinding stone 3 undergoes the rocking motion. Each of the grinding stones 3 rockingly displaces when the rollers W are successively transported in a condition with the crowned portions Wc of the respective roller W contacts the lower end edge portion 3a of the associated grinding stone 3. Focusing attention on only one of the rollers W, it will readily be understood that the crowned portion Wc having a minute radius of curvature can be realized when as the respective roller W is transported from an upstream side towards a downstream side with respect to the direction of transport performed by the feed drums 1 and 2, the grinding stone 3 is slightly rockingly displaced in a counterclockwise direction as viewed in FIG. 9 and, at the same time, the roller W is transported with the outer peripheral surface of the roller W inclined relative to the lower edge portion 3a, which is a processing surface of the grinding stone 3.

Figure 6:
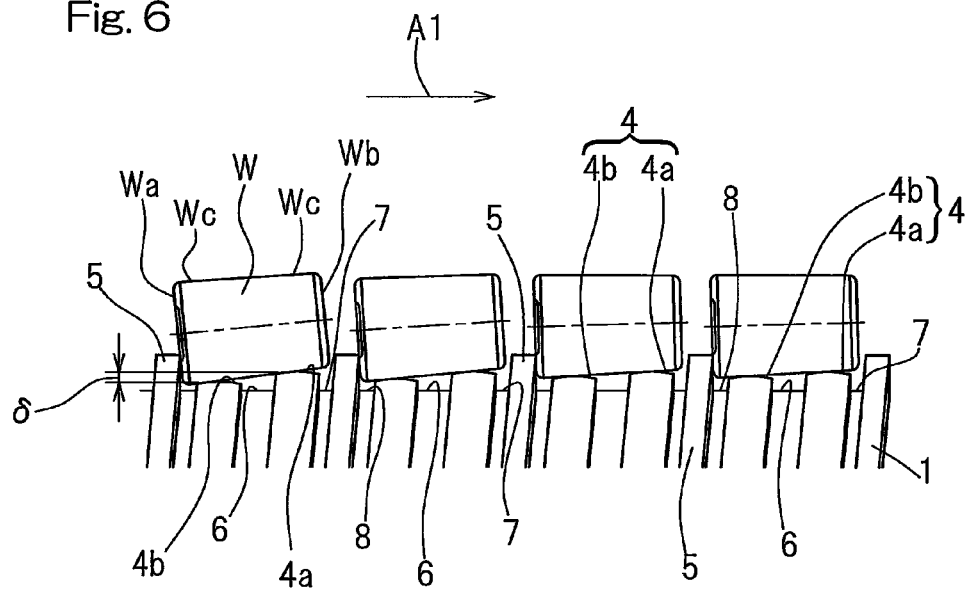
FIG. 6 is a front elevational view of an important portion of a feed drum employed in the processing apparatus.

As shown in FIG. 1, the two feed drums 1 and 2 are a male side feed drum 1 and a female side feed drum 2. Of those feed drums the male side feed drum 1 has its threaded guide surface 4 divided by a spirally extending, collared convolutions 5 from neighboring peripheral portions. As best shown in FIG. 6, when the feed drums 1 and 2 are rotated in a condition with a large diameter end face Wa of each of the rollers W held in contact with the adjacent collared convolution 5, the roller W can be transported from the upstream side towards the downstream side with respect to the direction of transport indicated by the arrow A1 with the small end face Wb of the roller W oriented forwards with respect to the direction of transport A1. The threaded guide surface 4 referred to above is divided into two divided threaded surface areas 4a and 4b that are axially juxtaposed relative to each other so as to support the outer peripheral surface of the corresponding roller W at two anteroposterior locations. A circumferentially extending groove 6 is formed between the axially juxtaposed divided threaded surface areas 4a and 4b that are so divided by the adjacent collared convolutions 5. Circumferentially extending grooves 7 and 8 each having a width smaller than the circumferentially extending groove 6 between the divided threaded surface areas 4a and 4b are also formed between each of the divided threaded surface areas 4a and the adjacent collared convolution 5 and between each of the divided threaded surface areas 4b and the adjacent collared convolution 5, respectively. It is to be noted that the female side feed drum 2 shown in FIG. 1 is not provided with any collared convolutions 5, but the threaded guide surface 4 of such female side feed drum 2 is made up of axially juxtaposed divided threaded surface areas 4a and 4b for supporting the outer peripheral surface of the respective roller W at the two anteroposterior locations.

Figure 7:
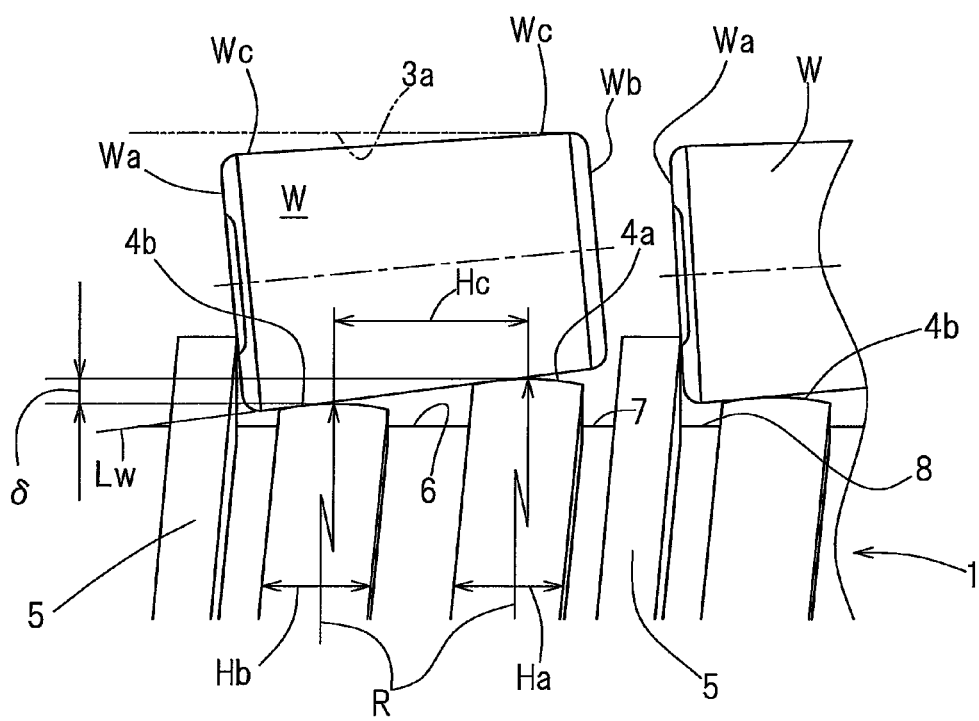
FIG. 7 is an enlarged front elevational view of the important portion of the feed drum.

As shown in FIG. 7, in the section along the central axis of the feed drum 1, each of the divided threaded surface areas 4a and 4b has a predetermined range of the radius of curvature R (for example, 3 to 20 mm in the instance as shown) and has an arcuate shape that protrudes on an outer diametric side, i.e., radially outwardly. Of the two axially juxtaposed, divided threaded surface areas 4a and 4b, each of the divided threaded surface areas 4a on the downstream side with respect to the direction of transport of the roller W supports a front side portion of the outer peripheral surface of the roller W whereas each of the divided threaded surface areas 4b on the upstream side with respect to the direction of transport of the roller W supports a rear side portion of the outer peripheral surface of the roller W. Accordingly, in each of the two feed drums 1 and 2, the roller is supported at two points on the divided threaded surface areas 4a and 4b. Although the site of contact of one divided threaded surface area 4a or 4b with the roller W may be a line contact at a minimum region, it is regarded that a point contact takes place at a point intermediate between axial tip and rear ends at the site of contact of the divided threaded surface area 4a or 4b.

In each of the feed drums 1 and 2, each of the divided threaded surface areas 4a or 4b has an axial dimension Ha or Hb which is so prescribed as to be of the same dimension over the entire direction of transport. Also, the top-to-top distance Hc, which is the distance between the maximum diametric portions of the neighboring divided threaded surface areas 4a or 4b that are axially juxtaposed relative to each other and divided by the collared convolutions 5, is so prescribed as to be of a constant dimension in dependence on the length of the roller W to be processed.

At a position on the feed drums 1 and 2 from the upstream side with respect to the direction of transport to the vicinity of an intermediate point of transport, of the neighboring divided threaded surface areas 4a and 4b that are axially juxtaposed relative to each other, a roller contact point of the divided threaded surface area 4a on the downstream side with respect to the direction of transport is rendered to protrude radially outwardly beyond a roller contact point of the divided threaded surface area 4b on the upstream side with respect to the direction of transport, and a linear line Lw connecting between those two roller contact points is rendered to incline relative to the lower end edge portion 3a which is the processing surface of the grinding stone 3. Accordingly, at the position on the feed drums 1 and 2 from the upstream side with respect to the direction of transport to the vicinity of the intermediate point of transport, the linear line Lw connecting between those two roller contact points represents such a shape as to be inclined upwardly as it goes towards the direction of transport, that is, such a shape as to flare radially outwardly in a direction conforming to the direction of transport of the roller W to be processed.

At a position on the feed drums 1 and 2 from the vicinity of the intermediate point of transport to the downstream side with respect to the direction of transport, of the neighboring divided threaded surface areas 4a and 4b that are axially juxtaposed relative to each other, the roller contact point of the divided threaded surface area 4b is rendered to protrude radially outwardly beyond the roller contact point of the divided threaded surface area 4a, and the linear line Lw connecting between those two roller contact points is rendered to represent such a shape as to be inclined downwardly as it goes towards the direction of transport, that is, such a shape as to converge radially inwardly in a direction conforming to the direction of transport of the roller W to be processed.

The divided threaded surface areas 4a and 4b are such that the difference δ between the respective radii of curvature at the roller contact points of the two axially juxtaposed, divided threaded surface areas 4a and 4b is varied depending on a roller passing position of the feed drum 1 or 2. More specifically, where each of the crowned portions Wc of the tapered roller is desired to be superfinished with the use of the processing apparatus of the present invention, the difference δ in radius of curvature is gradually varied from a condition, in which it is set to a large value, to a small value from the upstream side of transport to the vicinity of the intermediate point of transport, but the difference δ in radius of curvature is conversely varied gradually from a condition, in which it is set to a small value, to a large value from the vicinity of the intermediate point of transport to the downstream side of transport.

In the instance now under discussion, as best shown in FIG. 7, the respective roller contact points of the neighboring divided threaded surface areas 4a and 4b of the feed drums 1 and 2 with respect to the direction of transport by the feed drums 1 and 2 are separately varied between the divided threaded surface area 4a on the front side and the divided threaded surface area 4b on the rear side. Accordingly, as shown in FIGS. 9 and 10, relative to the lower end edge portion 3a of the grinding stone 3, which is the processing surface of the grinding stone 3, a surface of the roller W, which is guided in contact with the axially lined two roller contact points, is inclined. Also, the angle α of inclination of the linear line Lw, connecting between the two roller contact points of the two divided threaded surface areas 4a and 4b, relative to the central axis L1 of the feed drum is continuously changed in a direction from the upstream side with respect to the direction of transport of the roller W towards the downstream side thereof. With the axially juxtaposed two divided threaded surface areas 4a and 4b so formed as hereinabove described, the angle of inclination of the outer peripheral surface of the roller W relative to the processing surface of the grinding stone 3 changes continuously.

Figure 8:
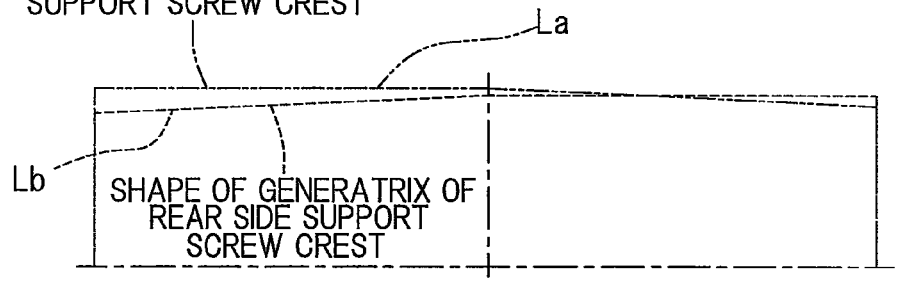
FIG. 8 is a diagram showing a trajectory of a workpiece support position on the feed drum for the tapered roller.

In FIG. 8, regarding the roller contact point of the divided threaded surface area 4a on the front side, a trajectory La ranging from the upstream side towards the downstream side with respect to the direction of transport is shown by the double dotted chain line whereas a trajectory Lb of the roller contact point of the divided threaded surface area 4b on the rear side is shown by the dotted line. In other words, the divided threaded surface areas 4a and 4b of the feed drums 1 and 2 are so formed that the angle α of inclination of the linear line Lw, connecting between the two roller contact points relative to the processing surface of the grinding stone 3, relative to the central axis L1 of the feed drum can be varied continuously in the sequence of large→small→large in a direction from the upstream side towards the downstream side with respect to the direction of transport of the roller W.

Therefore, as clearly shown in FIG. 9, when the tapered roller W is passed from the upstream position towards the intermediate position in the direction of transport by the feed drum 1, the crowned portion Wc on a small end face Wb side of the outer peripheral surface of the tapered roller W is superfinished by the lower end edge portion 3a of the grinding stone 3. Then, when the tapered roller W is passed from the intermediate position towards the downstream position in the direction of transport by the feed drum 1, the crowned portion Wc on the large end face Wa side of the outer peripheral surface of the tapered roller W is superfinished by the lower end edge portion 3a of the grinding stone 3. Accordingly, as shown in FIG. 3, the crowned portion Wc of a shape represented by the logarithmic function can be processed on the tapered roller W. The crowned portion Wc of the shape represented by the logarithmic function is a crowned portion Wc expressed by the logarithmic function and capable of uniformize an axial distribution of contact pressures. By processing the logarithmic crowning capable of uniformizing the axial distribution of contact pressure on the tapered roller W in this way, it is possible to avoid a so-called edge load.

According to the processing apparatus of the structure hereinabove described, the two feed drums 1 and 2 are disposed in a fashion parallel to each other and the roller W between the feed drums 1 and 2 is, while being rotated about its own longitudinal axis by the rotation of the feed drums 1 and 2, transported from the upstream side towards the downstream side with respect to the direction of transport. The grinding stone 3 is pressed against the roller W being passed between the feed drums 1 and 2 to thereby process the crowned portions Wc. At this time, since the threaded guide surface 4 of the feed drums 1 and 2 is divided into the axially juxtaposed two divided threaded surface areas 4a and 4b so that the outer peripheral surface of the roller W can be supported at the two anteroposterior locations of the roller W, the difference in radius of curvature can be applied to the two roller contact points of the divided threaded surface areas 4a and 4b and, therefore, the roller W can be inclined at an arbitrarily angle of inclination relative to the grinding stone 3. Also, since the threaded guide surface 4 is divided into the two axially juxtaposed divided threaded surface areas 4a and 4b, the outer peripheral surface of the roller W can be assuredly supported at the two anteroposterior locations. Accordingly, since the crowned portions Wc of a plurality of the rollers W can be successively processed by means of the through feed processing with the use of the feed drums 1 and 2, the length of time required to complete the processing can be reduced as compared with that in which the rollers are processed on a piecemeal basis to form the crowned portions Wc, and, therefore, the processing apparatus of the present invention can be suitably applied in a mass production. In view of the above, the cost of manufacture of the rollers W can be reduced.

Since in the section along the central axis of the feed drum 1, each of the divided threaded surface areas 4a and 4b is of the arcuate shape protruding radially outwardly, not only can the angle α of inclination of the linear line Lw, connecting between the two roller contact points, relative to the central axis L1 of the feed drum be set to any desired angle, but also the rollers W can be caused to smoothly contact the divided threaded surface areas 4a and 4b each being of an arcuate shape.

The divided threaded surface areas 4a and 4b are such that the difference δ between the respective radii of curvature of the two axially juxtaposed divided threaded surface areas 4a and 4b is varied depending on the roller passing position of the feed drums 1 and 2. With the difference δ between the respective radii of curvature of the two axially juxtaposed divided threaded surface areas 4a and 4b being varied in the manner described above, the angle α of inclination of the linear line Lw that connects between the roller contact points at the two roller contact points can be easily and assuredly changed. Accordingly, the angle of inclination of the outer peripheral surface of the roller W relative to the processing surface of the grinding stone 3 can be easily and assuredly changed.

Since the threaded guide surface 4 of the feed drum 1 is divided by the spirally extending collared convolutions 5 from the neighboring peripheral portions, the roller W can be transported from the upstream side towards the downstream side in the direction of transport when the feed drums 1 and 2 are rotated while the large end face Wa of the roller W is held in contact with the adjacent collared convolution 5.

Regarding the tapered roller, with the conventional through feed processing technique, it has been impossible to accomplish either the crowning to form a shape represented by a logarithmic curve or the crowning to provide a cut of a single curvature. However, according to the processing apparatus designed in accordance with the present invention, by continuously varying the angle α of inclination of the linear line Lw, connecting between the two roller contact points of the divided threaded surface areas 4a and 4b, relative to the central axis L1 of the feed drum, it has now become possible to accomplish not only the crowning of the tapered roller to have a logarithmically curved shape, but also the crowning of the tapered roller to have a minute curvature (for example, not greater than the radius of curvature of 1,000 mm). Nevertheless, according to the processing apparatus of the present invention, it is possible to apply the crowning process to the tapered roller so as to have a single radius of curvature. Also, the process to have a crowned portion free from a straight portion can also be applied to the outer peripheral surface of the tapered roller. When the difference δ between the respective radii of curvature of the two axially juxtaposed divided threaded surface areas 4a and 4b is chosen in dependence on the various crowned portions as discussed above, the required crowned portion can be easily processed in a length of time shorter than that hitherto required.

Since with the use of the plurality of the grinding stones 3 as hereinbefore described the crowned portions of the rollers W are processed, one some of the grinding stones 3 can be removed from the support member M, best shown in FIG. 9, for replacement in the event that a biased frictional wear or an earlier frictional wear occur in one or some of the grinding stones 3. Accordingly, the cost for maintenance can be reduced.

Since the circumferentially extending grooves 6 are formed between the two axially juxtaposed divided threaded surface areas 4a and 4b in the feed drums 1 and 2, abrasive grains used in processing of the crowned portions Wc can be smoothly discharged to the outside of the feed drums 1 and 2 after they have been temporarily stored within the circumferentially extending grooves 6. Accordingly, since the abrasive grains remaining at locations of contact of the divided threaded surface areas 4a and 4b with the rollers W is minimized, the outer peripheral surface of the roller W can be set to the desired angle α of inclination. Accordingly, it is possible to process the crowned portions Wc with high accuracy.

The processing apparatus of the present invention may be used not only in superfinishing the crowned portion of the tapered roller, but also in crowning the tapered roller. The workpiece to be processed may not necessarily be limited to the tapered rollers that are used in a tapered roller bearing assembly, but may be any tapered members such as, for example, tapered pins or cylindrical rollers used in a cylindrical roller bearing assembly.

Converse to that shown in FIG. 9, at the position on the feed drums 1 and 2 from the upstream side with respect to the direction of transport to the vicinity of the intermediate point of transport, the two axially juxtaposed divided threaded surface areas may be formed so that the roller having its small end face oriented in a direction conforming to the direction of transport is inclined downwardly with respect to the direction of transport. Also, at the position on the feed drums 1 and 2 from the vicinity of the intermediate point of transport to the downstream side with respect to the direction of transport, the two axially juxtaposed divided threaded surface portions may be formed so that the roller having its small end face oriented in the direction conforming to the direction of transport is inclined upwardly with respect to the direction of transport. Even in such case, in the region ranging from the upstream position of the direction of transport by the feed drums to the intermediate location of the direction of transport, the difference in radius of curvature is caused gradually from the condition, in which it is large, to a small value and, in the region ranging from the intermediate location of the direction of transport by the feed drums to the downstream position of the direction of transport, the radius of curvature is conversely caused gradually from the condition, in which it is small, to a large value. By so doing, it is possible to apply the crowning process, similar to that shown in and described with reference to FIG. 9, to the rollers.

Figure 11A:
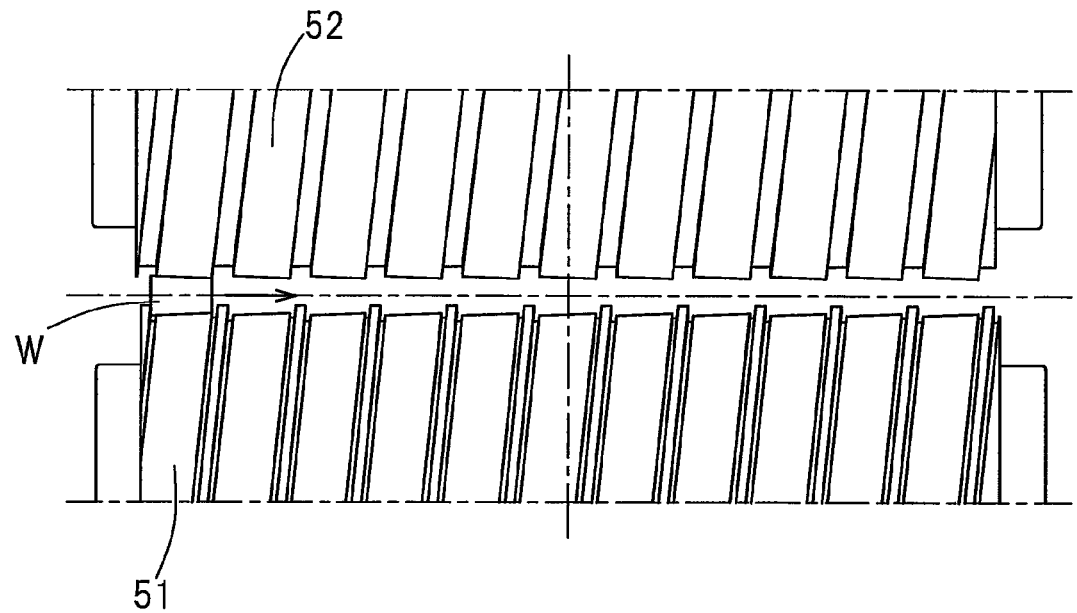
FIG. 11A is a top plan view of the conventional feed drum assembly.
Figure 11B:
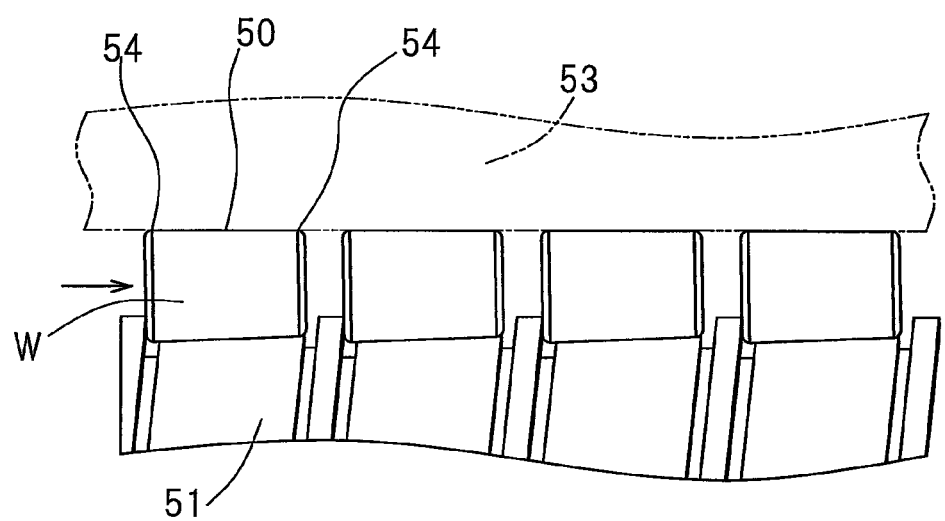
FIG. 11B is a fragmentary front elevational view of a portion of the conventional feed drum assembly shown in FIG. 11A.

Although in the embodiment shown in and described with reference to FIG. 9, the crowned portions We of the roller W have been processed with the use of the plurality of the grinding stones 3, the crowned portions at the small end face side and the large end face side of the outer peripheral surface of the roller may be processed by means of the through feed process with the use of only one grinding stone. It is also possible to accomplish the through feed process on the crowned portion by positioning the male side feed drum 1, shown in FIG. 1, and a feed drum 52 shown in FIG. 11A and having no divided threaded surface area in a fashion parallel to each other.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 2 . . . Feed drum
3 . . . Grinding stone
4 . . . Threaded guide surface
4a, 4b . . . Divided threaded surface area
5 . . . Collared convolution
L1, L2 . . . Central axis
W . . . Roller
We . . . Crowned portion

What is claimed is:

1. A processing apparatus for processing a crowned portion of a roller, which apparatus comprises:
   first and second feed drums each having an outer periphery formed with respective spirally extending threaded guide surfaces, the first and second feed drums extending parallel to each other and being driven to rotate about respective central axes to transport the roller, while the roller is held in rolling contact with the threaded guide surfaces opposed to each other, from a first location towards a second location through between the first and second feed drums; and
   a grinding stone for processing the crowned portion of the roller passing through between the first and second feed drums; and
   in which the threaded guide surface of the first and second feed drums is divided into two axially juxtaposed divided threaded surface areas so that an outer peripheral surface of the roller is supported at only two anteroposterior locations of the roller.

2. The processing apparatus as claimed in claim 1, in which in a section along the central axis of the feed drum, each of the divided threaded surface areas is of an arcuate shape protruding radially outwardly.

3. The processing apparatus as claimed in claim 1, in which the divided threaded surface areas are such that the difference between respective radii of curvature at roller contact points of the two axially juxtaposed divided threaded surface areas is varied depending on a roller passing position of the feed drum.

4. The processing apparatus as claimed in claim 1, in which a roller contact point of one of the two axially juxtaposed divided threaded surface areas is caused to protrude radially outwardly beyond a roller contact point of the other of the two axially juxtaposed divided threaded surface areas such that a surface of the roller guided in contact with those roller contact points is inclined relative to a processing surface of the grinding stone.

5. The processing apparatus as claimed in claim 4, in which the angle of inclination of a linear line, which connects between the roller contact points of the two divided threaded surface areas, relative to the central axis of the feed drum changes continuously from an upstream side towards a downstream side with respect to the direction of transport.

6. The processing apparatus as claimed in claim 1, in which the threaded guide surface of one of the first and second feed drums is divided by spirally extending collared convolutions from the neighboring peripheral portions.

7. The processing apparatus as claimed in claim 1, in which the roller is a cylindrical roller or a tapered roller.

* * * * *